Sept. 5, 1950  J. L. CLOUDSLEY  2,521,202
SHOCK-ABSORBING OR FLUID-PRESSURE RELIEVING APPARATUS
Filed June 10, 1947  2 Sheets-Sheet 1
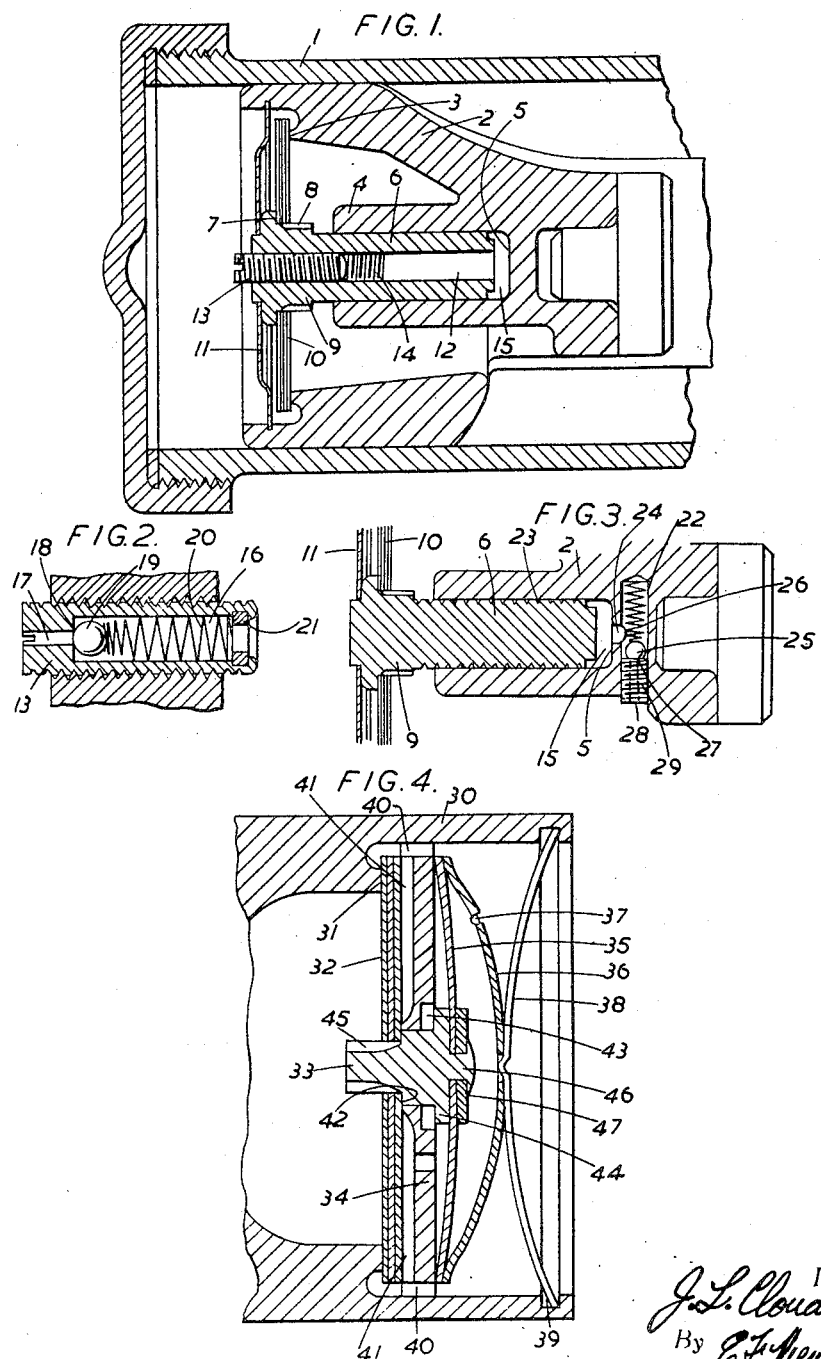

Sept. 5, 1950        J. L. CLOUDSLEY        2,521,202
SHOCK-ABSORBING OR FLUID-PRESSURE RELIEVING APPARATUS
Filed June 10, 1947        2 Sheets-Sheet 2
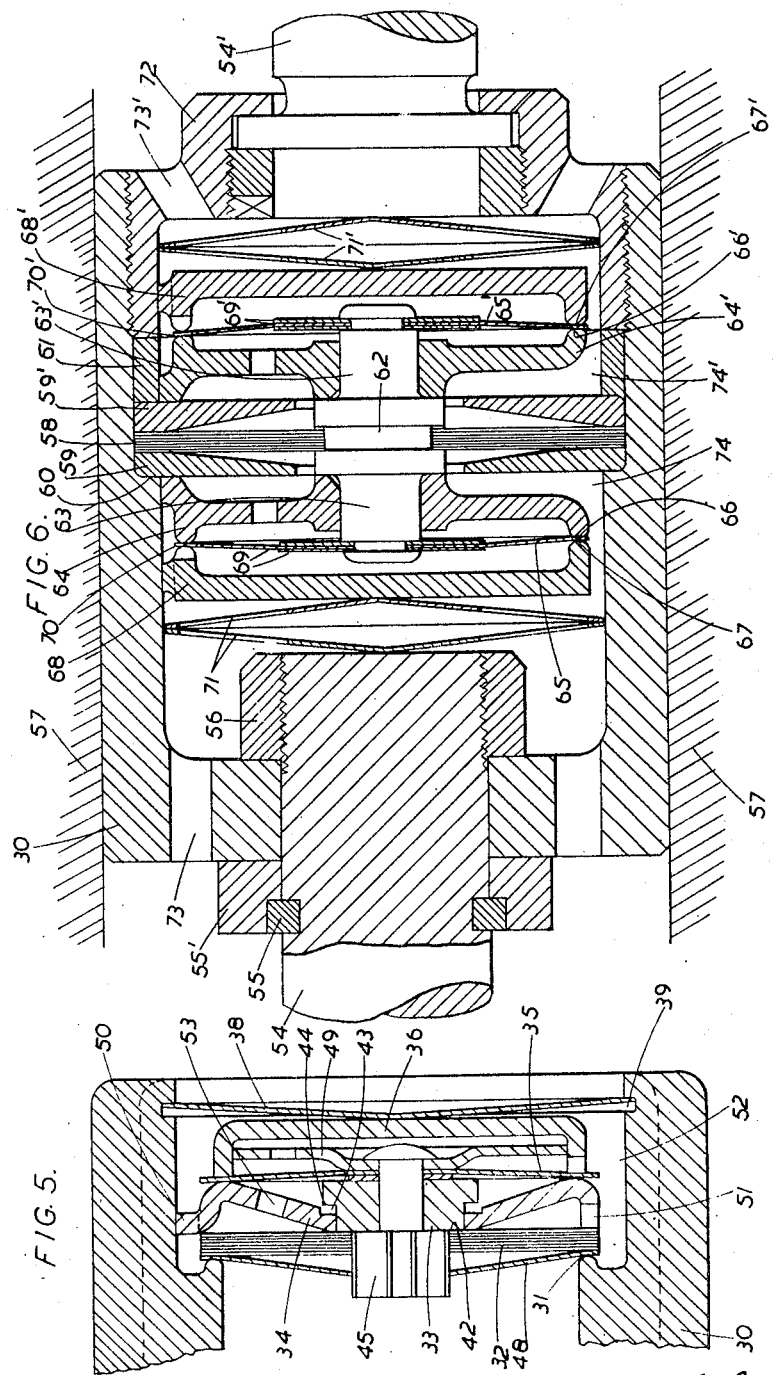

Patented Sept. 5, 1950

2,521,202

UNITED STATES PATENT OFFICE 2,521,202

SHOCK-ABSORBING OR FLUID-PRESSURE RELIEVING APPARATUS

John Leslie Cloudsley, Oxfordshire, England

Application June 10, 1947, Serial No. 753,758
In Great Britain December 22, 1938

Section 1, Public Law 690, August 8, 1946
Patent expires December 22, 1958

11 Claims. (Cl. 188—88)

The present invention relates to shock-absorbing or fluid-pressure-relieving apparatus, and especially to shock-absorbers of the kind in which the shock-absorbing effect is obtained by resistance set up by restricting the circulation of a fluid, such as oil, from one side of a damping piston to the other.

In accordance with the present invention shock-absorbing or fluid-pressure-relieving apparatus comprises a piston movable within a cylinder containing liquid which, during movement of the piston in one direction (recuperating stroke) causes a valve to be raised from a seat on part of the piston and so to permit the free passage of liquid through the piston, and which, during movement of the piston in the opposite direction (shock-absorbing stroke), under conditions of excess fluid-pressure within the cylinder causes a valve to be raised from a seat on a member movable relatively to the piston, and so to permit the passage of liquid therethrough, and under other conditions bears against the said member or an element connected therewith sufficiently to cause or permit the seat on such member to "follow-up" the valve as the latter is moved or tends to move therefrom by the liquid pressure, such "follow-up" movement progressing at a rate dependent on the resistance offered by a restricted passage, orifice or groove to the concurrent flow of fluid therethrough toward or away from said member.

In order that the present invention may be fully understood and carried into effect several embodiments thereof will now be described with reference to the accompanying drawings in which—

Figure 1 is a vertical section view of part of a shock-absorber cylinder and of the piston therein;

Figure 2 is a detail view of one form of spring-loaded ball valve for incorporation in the shock-absorber piston of Figure 1;

Figure 3 shows a further form of spring-loaded ball-valve as an alternative to the construction illustrated in Figure 2;

Figure 4 is a vertical section of part of a shock-absorber piston and of a valve-and-dashpot unit fitted in operative position therein;

Figure 5 is a vertical section of part of a shock-absorber piston and associated valve-and-dash-pot unit constituting a modification of that shown in Figure 4 and Figure 6 is a longitudinal section of a double-acting shock-absorber piston and associated valve-and-dashpot units.

Referring now to Figure 1, the reference numeral 1 indicates a portion of one cylinder of a shock-absorber of the double-piston type within which a piston 2 can reciprocate in consequence of movement imparted thereto by a drop arm, not shown, and suitable linkage connecting the same to the vehicle axle to be damped. The body of piston 2 is formed with a seat 3 and a boss 4, the latter being bored out to form a cylinder 5. Assembled in cylinder 5, which constitutes one member of a dash-pot assembly, is a cylindrical valve 6 which constitutes a second dashpot member. This member 6 has at its outer end a turned seat 7 and a plurality of grooves 8. Assembled on a boss 9 of member 6 are a plurality of disc washers or laminae 10 mounted with a free fit on boss 9. When the parts are assembled as shown the seat 7 of the dashpot member 6 bears against the outer face of laminae 10, the other side of said laminae (which constitutes a laminar valve member) bearing against the valve seat 3 formed on piston 2. The parts are retained in position by a blade or multifingered disc spring 11 so that laminae 10 contact with valve seats 3 and 7. It is to be noted that boss 9 is of larger diameter than the stem of dashpot member 6 which is a sliding fit in the other dashpot element 5. Dashpot element 6 is formed with an orifice 12 extending completely therethrough, said orifice being desirably provided as shown at the front end, with means for adjustably regulating the flow of liquid therethrough; said flow regulating means may, as shown, comprise a threaded member 13 cooperating with threads 14 in dashpot element 6, one or other of these threads being truncated to provide a helical passage for the flow of liquid, such that the further the threaded member 13 is screwed into dashpot element 6 the greater will be the resistance to flow of liquid into or from the space 15 between the end of dashpot element 6 and dashpot element 5. The dashpot constituted by element 5 and 6 is assisted in operation by either of the alternative valve arrangements illustrated in Figures 2 and 3. In the construction shown in Figure 2 the threaded element 13 is formed with an orifice 16 therethrough and forming a portion 17 of restricted diameter and forming a seat 18 for a ball valve 19 which is held in position by a spring 20 itself compressed by a compressing ring 21. With this arrangement fluid such as oil may flow freely through passage 12 from left to right as viewed in Figures 1 and 2 to allow the dashpot 5, 6 to recuperate, and so also to free the laminae 10 from restriction by seat 7 to enable fluid to pass freely from the righthand side of piston 2 past laminae 10 to the lefthand side of the piston, as the piston effects its movement from left to right (recuperating stroke). In the alternative arrangement shown in Figure 3, a ball valve similar to that of Figure 2 is provided in a lateral passage 22 formed in piston 2 and in this construction dashpot element 6 is not formed with an aperture or through way, but, whilst being a sliding fit within dashpot element 5, is provided with a helical groove 23 which forms a restricted outlet from the space 15 between the two elements 5 and 6. Space 15 communicates with transverse passage 22 by a short passage 24 and a ball 25 is urged by spring 26 onto a seat 27 constituted by one end of an orifice 28 formed in a plug 29 that is screwed laterally into piston 2.

When the vehicle axle to which is connected the drop arm (not shown), rises, the piston 2 moves to the left as viewed in Figure 1. If the movement is very slow the oil pressure acting on the laminar valve 10 and the head portion of dashpot element 6 will move them together towards the right relatively to dashpot element 5 until the righthand end of dashpot element 6 abuts against the end wall of dashpot element 5 or until the shoulder or boss 9 of dashpot element 6 reaches and is stopped by the face of boss 4 of piston 2, depending on the relative dimensions of the parts. Continued movement of piston 2 causes laminae 10 to leave the seat 7 on dashpot element 6 and to permit oil to discharge through grooves 8. It will be clear that dashpot element 6 is subject to an oil pressure which tends to maintain it in this position; the force produced by this oil pressure results from the pressure acting on the area of boss 9 less that acting on the sectional area of dashpot element 6 within dashpot element 5, since the pressures at the front and rear of dashpot elements 6 are balanced. With dashpot element 6 thus moved to its extreme right-hand position as viewed in Figure 1, there is obtained the position of maximum resistance to opening of laminar valve 10 and this would persist to the end of the stroke of piston 2.

If piston 2 be now moved to the right (recuperation stroke) the laminar valve 10 reasserts itself from the deformed position just alluded to and first of all returns to the unbiassed position shown in Figure 1 and then gives way to the pressure of oil seeking to pass through the piston from right to left and leaves seat 3, the dashpot element 6 moving therewith in virtue of the freedom of oil to pass from left to right through orifice 17 and past ball valve 19 into the cavity 15 between dashpot elements 5 and 6 in the case of the construction shown in Figure 2. When the construction shown in Figure 3 is used, the dashpot element 6 moves from right to left in relation to the piston 2, during the recuperation stroke, by reason of the freedom of oil to pass the valve 25 and to enter the space 15.

If fairly rapid movement of piston 2 occurs from right to left as viewed in Figure 1 the effect for a portion of the stroke will be that laminar valve is forced against seat 3, dashpot element 6 being prevented, by reason of oil trapped within cavity 15, from moving quickly to the right and in these circumstances laminae 10 are deflected rightwardly at their centres and leave seat 7 and allow a rapid displacement of oil. As the movement of piston 2 continues (in the case of the construction shown in Figure 2) dashpot element 6 gradually moves to the right as oil is expelled from cavity 15 through orifice 12 and the helical passage formed by the threads 14 and the threads on the member 13, and the displacement of laminae 10 from seat 7 is reduced, since seat 7 follows movement of laminae 10 until dashpot element 6 has moved to the limit of its travel to the right. The effect of this action will be a tendency to maintain the pressure in cylinder 1, and may in fact increase it, since the resistance to opening of laminar valve 10 will be greater when dashpot 6 abuts against dashpot element 5 than it will be in the position illustrated in Figure 1, due to the compression of laminae 10 which may be regarded as a leaf spring valve. The original deflection of laminae 10 will, of course, depend upon the rate-of-change of displacement of oil from one side of the piston to the other. When the construction shown in Figure 3 is used, the dashpot member 6 also moves to the right, but its rate of displacement in this direction at any given instant will decrease in proportion to displacement which has already taken place. This relationship obtains because, as the member 6 moves from left to right, the number of turns of the helical groove 23, through which the oil in the space 15 has to pass to reach the left hand side of the piston 2, increases, thereby decreasing the flow of oil from the space 15, for any given difference of pressures between the oil in the space 15 and the oil to the left of the piston 2. Since the laminae 10 will, at any given instant, resist displacement to the right to an extent proportional to the displacement which has already taken place, it is clear that the construction of Figure 3 permits the valve seating 7 to follow up the valve 10 with a type of movement more closely analogous to that of the valve than is the case when the construction shown in Figure 2 is used. In other words the increase in resistance to fluid flow from the space 15 is effected automatically in correspondence with the displacement of the piston.

Referring now to Figure 4, the reference numeral 30 indicates a portion of a piston forming part of a shock-absorber of the double-piston type within which the piston 30 can reciprocate in consequence of movement imparted thereto by a drop arm, not shown, and suitable linkage connecting the drop arm to a vehicle axle, the movements of which are to be damped. Piston 30 is formed with a seat 31 against which bears a laminar valve 32 consisting of a plurality of thin plates. Laminated valve 32 is formed with a central aperture, the edge of which is adapted to seat against a valve member 33 which is slidably carried in a plate 34 and itself is fixed to a flexible steel diaphragm 35 which bears against plate 34. A domed member 36, provided with a small orifice 37, is maintained by a retaining spring 38 in substantially fluid-tight contact with diaphragm 35. Retaining spring 38 is sprung into an annular groove 39 formed in piston 30. In order to maintain domed member 36 in centralised position within piston 30, member 36 may be formed with a slight protuberance adapted to cooperate with a corresponding depression in spring 38 or vice versa. Plate 34 is formed at its periphery with slots 40 which permit liquid to flow from one side of said plate to the other and into grooves 41 which may be formed radially of plate 34. Valve member 33 is formed with a seat 42 against which laminar valve 32 normally bears. The valve dash-pot assembly comprising laminar valve 32, valve member 33, plate 34, diaphragm 35 and domed member 36, is freely slidable against the pressure of retaining spring 38 a predetermined distance to the right of the position in which the parts are shown in Figure 4. If desired, plate 34 may be provided with a small opening, as shown in Fig. 4, to enable liquid to occupy the space between said plate and diaphragm 35; the edge of diaphragm 35 may, however, make a non-fluid-tight contact with plate 34, and it may be sufficient to permit fluid to enter between diaphragm 35 and plate 34 merely in virtue of this edge contact.

It will be seen from the drawing that diaphragm 35 and the valve member 33 to which it is rigidly connetced can move for a short distance relatively to plate 34, the latter being provided with a recess 43 adapted to accommodate the flange 44 of valve 33 when the latter moves to its extreme leftward position. Valve 33, as shown, is formed with grooves 45 which enables the free flow of fluid when laminar valve 32 is raised as hereinafter described, from its seating 42 on valve member 33.

Piston 30, as previously explained, is slidable within an oil-containing cylinder, not shown, in accordance with relative movements of a vehicle axle and frame. When piston 30 moves to the left as viewed in Figure 4, liquid, such as oil, lying to the left of laminar valve 32 will bear against the latter, causing the same to be lifted off its seat 31, and the oil will then pass through grooves 40 to the righthand side of the valve dashpot assembly; this action occurs only during the leftward or recuperation stroke of the piston 30. When piston 30 moves to the right as viewed in the said figure, oil passes through grooves 40 and radially inward along grooves 41 and bears against the righthand side of laminar valve 32 which, after the liquid pressure has reached a predetermined value, is lifted from seat 42 of valve 33 to permit the passage of liquid therepast. It will be understood that the greater the liquid pressure in these circumstances, the greater will be the deflection of valve 32 and the consequent relief of such pressure.

Diaphragm 35 and domed member 36 together form a dashpot chamber of which the wall constituted by diaphragm 35 is movable with valve 33. If the rightward movement of piston 30 is very sudden or violent, laminar valve 32 will quickly be deflected so as to relieve the excess fluid pressure before there has been time for sufficient liquid to pass through orifice 37 to cause or permit diaphragm 35 and the attached valve member 33 to "follow-up" the leftward movement of valve 32. If the rightward movement of piston 30 is of such a rate that the oil pressure on the right of the piston, as viewed in the figure, does not build up violently, then oil entering through inlet orifice 37 into the dashpot chamber constituted by diaphragm 35 and member 36 will tend to cause diaphragm 35 and valve 33 to "follow-up" any leftward opening movement of valve 32 and so maintain the resistance to the flow of fluid through piston 30 at a high value. When portion 44 of valve member 33 abuts against plate 34 further leftward movement of the valve member 33 is prevented and any further leftward movement of valve 32 will lift it clear of seating 42 and so permit the release of fluid.

The cycle of operation and the shock-absorbing effects produced by the construction above described in connection with Figure 4 is substantially identical with that of the apparatus described above in connection with Figures 1, 2 and 3. The construction of Figure 4 is preferred, however, to that of Figs. 1, 2 and 3 as being simpler to manufacture, and more readily assembled and disassembled.

The effect of the provision, in a shock-absorber of the dashpot, valve construction described and illustrated herein is to secure that rapid shock-absorbing movements of piston 30 (such as results from a vehicle wheel travelling over rough ground, potholes and the like) produces immediate relief of fluid pressure after the same has reached a predetermined value; whereas when the vehicle axle movements to be damped are of a slow character (such as those resulting from gradual undulations in a road surface, or from the vehicle spring-compressing effect produced when a vehicle corners) a progressively increasing resistance to fluid flow through piston 30 is provided due to the "following-up" by valve member 33 of leftward movements of the laminar valve 32, the latter increasing in tension, and consequent resistance to fluid flow, as it is progressively moved leftwards as shown in the drawing.

The effective cross-sectional area of the dashpot orifice 37 may, if desired, be rendered adjustable, although, due to the extreme simplicity of the construction an effective adjustment could most easily be secured by merely removing one domed member 36 and replacing it by another having an orifice 37 of different cross-sectional area.

Valve member 33 may, as shown, be formed in a single piece, wherein the head 46 is turned over against a washer 47 by which diaphragm 35 is held against portion 44 or valve member 33, may be formed in two or more parts riveted, screwed, or otherwise held together.

Referring now to Figure 5, this illustrates a modification of the shock-absorber piston and associated valve-and-dashpot unit described above with reference to Figure 4, similar parts being similarly numbered in the two figures. In Figure 5 piston 30 is formed with a seat 31 against which bears a dished multifingered washer 48 which serves as a limit stop to prevent excessive deflection (and possible permanent deformation) of a laminar valve 32 consisting of a plurality of thin plates. Laminar valve 32 is formed with a central aperture, the edge of which is adapted to seat against a valve member 33 which is slidable within a dished washer 34 and is riveted to a dished washer 49 and to a flexible steel diaphragm 35 which bears against plate 34. A domed member 36 formed with a radial groove where it abuts against diaphragm 35 is maintained by a retaining spring 38 in substantially fluid-tight contact with diaphragm 35, and is itself maintained centrally of the apparatus by the dished washer 49. Retaining spring 38 is sprung into an annular groove 39 formed in piston 30. The entire valve-and-dashpot assembly is supported radially within piston 30 on three radial tongues 50 spaced at 120° apart, one of which is seen in the drawing, formed on dished washer 34 which is provided with a port 51 permitting a flow of fluid to the centre of the washer; due to ports 52 and 53 fluid can also flow from one side of washer 34 to the other. Valve member 33 is formed with a seat 42 against which laminar valve 32 normally bears. The valve-dashpot assembly, comprising laminar valve 32, valve member 33, dished washer 34, diaphragm 35 and domed member 36, is freely slidable against the pressure of retaining spring 38 a predetermined distance to the right of which the parts are shown in Figure 5. It will be seen from the drawing that diaphragm 35, and the valve member 33 to which it is rigidly connected, can move for a short distance relatively to washer 34, the latter being provided with a recess 43 adapted to accommodate the flange 44 of valve 33 when the latter moves to its extreme leftward position. Valve 33, as shown, is formed with grooves 45 which enable the free flow of fluid when laminar valve is raised from its seating 42 on valve member 33.

Piston 30 is slidable within an oil-containing cylinder, not shown, in accordance with relative movements of a vehicle axle and frame. When piston 30 moves to the left as viewed in Figure 5 liquid such as oil lying to the left of laminar valve 32 will bear against the latter causing the retaining spring 38 to yield and allow the valve 32 and associated parts to be lifted off its seat 31 and the oil will then pass through apertures 52 to the righthand side of the valve-dashpot assembly; this action occurs only during the leftward or recuperation stroke of piston 30. When piston 30 moves to the right as viewed in Figure 5, oil passes through openings 52 and radially inward through port 51 and bears against the righthand side of laminar valve 32 which, after the liquid pressure has reached a predetermined value, is lifted from seat 42 of valve member 33 to permit the passage of liquid therepast and leftwardly along groves 45. It will be understood that the greater the liquid pressure in these circumstances, the greater will be the deflection of valve 32 and the consequent relief of such pressure.

Diaphragm 35 and domed member 36 together form a dashpot chamber of which the wall constituted by diaphragm 35 is movable with valve 33. If the rightward movement of piston 30 is very sudden or violent, laminar valve 32 will be quickly deflected so as to relieve the excess fluid pressure before there has been time for sufficient liquid to pass through the radial orifice formed in the edge of domed member 36 where it contacts with diaphragm 35, to cause or permit the latter and the attached valve member 33 to "follow-up" the leftward movement of valve 32. If the rightward movement of piston 30 is of such a rate that the oil pressure on the right of the piston, as viewed in Figure 5, does not build up violently, then oil entering through the radial channel above referred to into the dashpot chamber constituted by diaphragm 35 and valve member 36, will tend to cause diaphragm 35 and valve member 33 to "follow-up" any leftward opening movement of laminar valve 32 and so maintain the resistance to flow of liquid through piston 30 at a high value.

The cycle of operation and the shock-absorbing effect produced by the construction above described in connection with Figure 5 is thus substantially identical with that of the similar apparatus described above in connection with Figure 4.

Reference is now directed to Figure 6 of the drawings, wherein there is illustrated a double-acting shock-absorbing piston and associated pair of valve-and-dashpot units designed similarly to the apparatus above described with reference to Figure 5.

A piston 30 is rigidly attached to a piston rod 54 by means of rings 55, 55', and the nut 56, and is reciprocable, upon relative movement of two members (e. g. a vehicle axis and frame) of which relative movement is to be damped, in an oil-filled cylinder 57, of which only the central portion is shown. A plurality of flexible steel laminae 58 are held loosely between a pair of limiting plates 59, 59' held between a seating 60 in piston 30 and a seating on a sleeve 61, but so that the laminae are not actually gripped. The laminae are pierced at the centre to form a passage 62 through them which passage is normally sealed at each end by valve members 63,63', which are supported radially in the centre of parts 64, 64', which in turn are supported in the internal bore of piston 30 on interupted flanges.

Valves 63, 63' are connected to flexible diaphragms 65, 65', respectively, which are gripped at their peripheries between faces 66 and 67 of parts 64 and 68, and faces 66' and 67' of parts 64' and 68' respectively. As shown, diaphragms 65, 65' are provided adjacent their point of connection with valves 63 and 63' with reinforcing spring discs 69 and 69' which provides a yielding support for said diaphragms near their centres.

Members 68, 68' which are dome-shaped are provided with ports; alternatively, radial slits 70, 70' may, as shown, be provided in the peripheries of diaphragms 65 and 65'. Member 68 is pressed in position by a light spring 71 which in turn is kept in position by the nut 56 threaded on piston rod 54. Member 68' is pressed in position by a light spring 71', which in turn is supported and kept in position in portion 72 of piston 30. The two springs 71, 71' hold the intervening assembly together against the laminae 58. The right-hand portion 54' of the piston rod 54 is mounted in part 72 with limited freedom of radial displacement and serves as a liquid displacer rod to maintain constant the liquid space within cylinder 57 as the piston rod moves into and out of the cylinder.

The operation of the apparatus above described is as follows: When piston rod 54 is moved leftwardly it carries with it piston 30 together with the assembly of parts carried by it and piston rod 54'. Oil displaced between the left end of cylinder 57 and the left end of piston 30 passes through the parts 73 and the ports 74 of part 64 to the face of the laminae 58 which are then deflected rightwardly, and initially move the valve member 63' with its assembly of parts rightwardly against the pressure of spring 71'. The oil pressure acting upon the face of the valve member 63' moves the valve with its assembly of parts further against spring 71' to permit the discharge of oil through the central passage 62 of the laminae 58, which oil then passes through ports 74' in the part 64' to the righthand side of piston 30 through the ports 73'. Meanwhile valve member 63, which is restrained by the diaphragm 65 in dome-shaped member 68 moves forward during the stroke at a rate dependent upon the area of the port 70 and to a degree dependent upon the speed and length of the piston stroke. If the piston stroke is slow, valve member 63 will reach the limit of its rightward movement in the part 64.

When piston 30 reverses its direction of movement and moves rightwardly in cylinder 57, the pressure of the oil after passing through the ports 73' and 74' to the face of laminae 58, deflects the latter leftwardly and, acting upon the face of valve member 63, immediately pushes the same together with the diaphragm 65, to their leftward limit of movement in dashpot members 68 and 64; in this direction the dashpot does not function as such since the oil escapes at the periphery of the diaphragm 65. Meanwhile valve 63 functions as did valve 63' during the leftward stroke of piston 30. It will be appreciated that the apparatus shown in Figure 6 is in effect a combination of two pistons (such as that shown in Figure 4 or 5) arranged in opposed relation within a common cylinder and carried upon a common piston rod; only one laminar valve is, however, required.

Shock-absorbing of fluid-pressure-relieving apparatus comprising the constructions above described and illustrated in any of the figures referred to may be applied to a vehicle such as an automobile or to any machine or apparatus where a shock-load requires to be cushioned on one stroke.

The shock-absorber piston above described and illustrated, may be utilised as a piston in a fluid pump e. g. a compressor, the valve-dashpot assembly therein then serving as a combined inlet and excess pressure relief valve, and so serve as an automatic regulator for the discharge pressure of the pump.

What I claim is:

1. Fluid-pressure-relieving apparatus for use in shock absorbers and similar equipment, comprising a cylinder, a piston slidable therein and having a through passage for the flow of liquid to opposite sides of said piston, a valve seat on said piston, an annular disc-shaped valve of resiliently deformable material mounted in said piston and having an annular opening therein, and a dash-pot device, the movable element of which co-operates with said valve to normally obstruct the flow of the liquid therethrough in one direction.

2. Apparatus according to claim 1, the annular disc-shaped valve being constituted by an assembly of annular disc-shaped laminae.

3. Apparatus according to claim 1, the said annular valve being seated by its outer rim on the seat in the piston, and the dash-pot element co-operating with the rim of the annular opening of said valve.

4. Apparatus according to claim 1, the said dash-pot device comprising relatively movable elements enclosing a liquid, the escape of which from the space between said elements is restricted by a long narrow passage the length of which changes as the movable element of the dash-pot moves.

5. Apparatus according to claim 1, the said dash-pot device comprising relatively movable elements enclosing a liquid, the escape of which from the space between said elements is restricted by a long narrow passage the length of which changes as the movable element of the dash-pot moves and also comprising a one-way valve permitting inlet of liquid into the space between said elements.

6. Apparatus according to claim 1, the said dash-pot device comprising a flexible diaphragm controlling the movement of its movable element.

7. Apparatus according to claim 1 including within the cylinder and bearing against the second face of the annular disc-shaped valve a mirror-image assembly of the assembly bearing against its first face.

8. Apparatus according to claim 1 in combination with means for limiting the degree of resilient deformation of the valve when yielding to allow the flow of liquid therethrough.

9. Apparatus according to claim 1 in combination with a conically disked plate mounted near to the valve to limit the degree of resilient deformation of the valve when yielding to allow the flow of liquid therethrough.

10. Fluid-pressure-relieving apparatus for use in shock absorbers and similar equipment, comprising a cylinder, a piston slidable in said cylinder and having a through-passage for the flow of liquid to opposite sides of said piston, a dash-pot device carried by said piston, a valve seat on said piston, a valve normally seated on said valve seat but movable therefrom under the pressure of liquid flowing in one direction through said piston, and a member normally obstructing the flow of liquid in the opposite direction past said valve, said member being the movable element of said dash-pot device.

11. Fluid-pressure-relieving apparatus for use in shock absorbers and the like comprising a cylinder having liquid therein, a piston movable in said cylinder and having a passage therethrough, a valve seat on said piston, a valve co-operating with said valve seat and operating during movement of said piston in one direction to open said passage for allowing free flow of said liquid through said piston, a member movable relatively to said piston and having a passage therethrough, a valve seat on said member, a valve cooperating with said seat on said member, a restricted passage in said cylinder between said piston and said movable member, said valve on said member being raised during movement of said piston in a second direction by excess fluid-pressure in said cylinder and permitting flow of liquid through said member, said valve on said member bearing against the valve seat thereon in normal operation and said member providing a follow-up member for said valve as said valve moves under liquid pressure, the rate of movement of said follow-up member being dependent on resistance offered a flow of liquid through said restricted passage toward or away from said member.

JOHN LESLIE CLOUDSLEY.

REFERENCES CITED

The following references are of record in the file of this patent:

UNITED STATES PATENTS

| Number | Name | Date |
|---|---|---|
| 1,164,371 | Lovejoy | Dec. 14, 1915 |
| 2,095,112 | Wallace | Oct. 5, 1937 |
| 2,161,811 | Grebe | June 13, 1939 |
| 2,214,038 | Beecher | Sept. 10, 1940 |
| 2,240,644 | Focht | May 6, 1941 |
| 2,320,697 | Binder | June 1, 1943 |